Patented July 23, 1935

2,009,346

UNITED STATES PATENT OFFICE 2,009,346

AMIDO SULFONIC ACIDS AND PROCESS FOR THEIR PREPARATION

Erik Schirm, Dessau/Anhalt, Germany, assignor, by mesne assignments, to "Unichem" Chemikalien Handels A.-G., Zurich, Switzerland, a corporation of Switzerland No Drawing. Application February 17, 1933, Serial No. 657,261. In Germany February 17, 1932

23 Claims. (Cl. 260—124)

It has been found that excellent wetting-out, dispersing-, lathering- and cleansing-agents are attained by converting unsubstituted or monosubstituted amines, whereby at least one of the radicals adhering to the nitrogen is a higher molecular hydrocarbon-residue of the aliphatic or alicyclic series, with halogenated carboxylic acids possessing one or several movable halogen atoms, or with their anhydrides or chlorides, into the corresponding halogenated acidamides and thereupon by substituting sulfonic groups for one or several of the halogen atoms. The present procedure is based upon the following reaction equations:

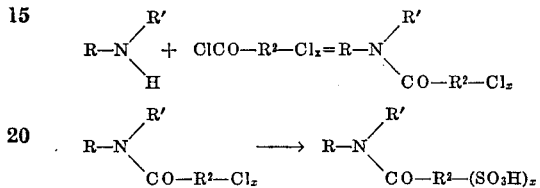

The producing of the amines employed is done by well-known methods as for example by a disintegration of the corresponding high molecular fatty acids or naphthenic acids by means of hydrazoic acid, or by the converting of hydro-halogenic esters of high molecular alcohols with ammonia or primary amines, whereby the latter may be substituted by hydroxylic hydrocarbon residues. Accordingly in the above reaction equations R means a high molecular hydrocarbon-residue of the aliphatic or alicyclic series and R' means hydrogen or any high or low molecular hydrocarbon-residue, which may moreover contain hydroxyl-groups. $R^2$ means a polyvalent, high or low molecular hydrocarbon-residue, which may likewise be hydroxyl substituted, provided that the halogenated carboxylic acid serving as initial product is an hydroxy-acid. $x$ represents the number of the sulfonic-groups depending upon the number of the movable halogen atoms which as a rule is 1 or 2.

The converting of the corresponding amine with the halogenated carboxylic acid is done by heating, and the use of a moderate vacuum will be useful for the purpose. If instead of the free carboxylic acid one employs its anhydride or chloride, the converting can be performed also under normal temperature and by the use of a neutral dissolving or diluting agent, such as ether, benzol, carbon-tetrachloride and the like. The substituting of the sulfonic groups for the halogen atom or halogen atoms respectively is done in the simplest manner by converting with alkali-sulphites under boiling in a reflux condenser or by pressure in the autoclave.

The primarily resulting halogenated carboxylic acidamides may also be treated with disulphides and the thus obtained sulphur compound can be converted into the corresponding sulpho-acid by subsequent oxidation. This oxidation may be brought about by means of strong oxidation agents such as nitric acid, permanganate of potassium, hydrogen peroxide, hypochlorites or the like, to which small quantities of oxidation catalysts such for instance as ammonium metavanadinate may be added for increasing the oxidizing action.

The carboboxylic-amide-mono- or polysulphonic acids obtained by this procedure and mono- or disubstituted on the nitrogen atom, represent capillary active substances which in the form of their alkali- or ammonium salts are of an extraordinary strength, and, in contradistinction to the amines they are based on, they are not poisonous. In acidic, neutral and alkaline solutions they are stable. Used with lime- or magnesia-hard water they do not separate any substances.

Owing to their excellent wetting-out, dispersing, lathering- and cleansing capacity they are fitted for the treating of textiles, particularly for dyeing, washing, mercerizing, dressing and reviving. For this purpose they are employed in analogous manner and in similar proportions as other textile treating agents of the kind such as for example the sulphuric acid ester salts of high molecular fatty alcohols, from which they however differ advantageously by a much higher stability to lime and magnesia. Owing to their high dispersing capacity they are likewise fitted for the manufacture of emulsions of greases, oils and waxes. They are also capable of use in combination with other well-known wetting-out, dispersing- and cleansing-agents.

In the following some characteristic examples are given merely in order to explain the invention and not to limit in any way the extension of the latter.

*Example 1*

241 parts by weight of cetylamine which for instance have been obtained by converting cetylchloride with a great excess of ammonia in the presence of butyl-alcohol as a solvent, in an autoclave at 180° C. and by fractionating the obtained mixture in vacuo, are heated, eventually under moderate vacuum, with 108,5 parts of β-chlor-propionic acid up to 160-230° C. and until water is all separated off. The residue is boiled under reflux with an alcoholic solution of 120 parts of sodium disulphide until the sodium chloride is likewise separated off. Thereupon the alcohol is evaporated, the residue is washed out by warm water and brought into a mixture warmed to 55–60° C. and consisting of 275 parts of nitric acid (60-62%) and 600 parts of 50% acetic acid to which mixture 0,2 part of ammonium metavanadinate has been added. Then one heats to 60° C. under stirring until the development of nitric oxide is finished, whereupon 150 parts of sodium sulphate are added; after cooling the deposited propioncetylamide-β-sulfonic acid sodium salt $C_{16}H_{33}$-NH-CO-$CH_2$-$CH_2SO_3$Na is filtered off; the latter can be gained pure by recrystallizing from water. The thus obtained product distinguishes itself by a high lathering and dispersing capacity, for instance in the manufacture of aqueous wax-emulsions. Such an emulsion is obtained for instance in dissolving 1 to 2 grammes of the present product in 1 liter of hot water, whereupon 10 parts of a natural wax are brought into the hot solution.

*Example 2*

205 parts by weight of dodecylchloride (from lauryl alcohol) are heated for some hours with 70 parts of β-hydroxyethylamine up to the boiling point of the latter until the mass has become solid. Then one dilutes with excess sodium lye, shakes out with ether or benzol, takes off from the aqueous layer and dries the upper layer with solid caustic lime, then one decants and after an addition of 80 parts of pyridine to the etherous or benzolic solution respectively, 113 parts of chloracetyl-chloride are dropped in under cooling with ice. Now one stirs for some time, dilutes with cold water, takes up the upper layer, dries it and evaporates the solvent. The residue is taken in alcohol and boiled under reflux with a concentrated aqueous solution of 350 parts of crystallized sodium sulphite until the transformation is terminated. Thereupon the alcohol is distilled off and the residue is recrystallized from water. By this one obtains the dodecylhydroxyethylacetamide sulfonic acid sodium salt

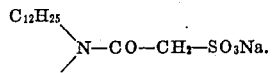

2 grams of this product dissolved in 1 liter of water, give a wetting-out-bath which wets out cotton and wool very quickly and promotes remarkably the uniform going on of the color during the subsequent dyeing with direct dyestuffs.

*Example 3*

1 gram-molecule of naphthenyl-amine such as can be obtained by the converting of naphthenic acids of the fraction $Kp_{10}$ 160–170° C. with hydrazoic acid, is dissolved in 1000 grammes of an indifferent organic solvent (ether, benzol, carbon tetrachloride or the like), then the solution is diluted with 125 grammes of dimethyl-aniline and cooled with ice. Under stirring 182 grammes of tri-chlor-acetyl-chloride are dropped in and the process is continued as per Example 2 but with the difference that the layer of solvent must be shaken out by means of diluted hydrochloric acid until complete elimination of the dimethyl-aniline, and that three times the therein indicated quantity of sodium sulphite is required. The thus obtained naphthenyl-acetamide-disulfonic acid sodium salt imparts a soft feel to the artificial silk in using it as an addition to the dye-bath.

What I claim is:—

1. An alkali salt of a carboxylic amide sulfonic acid of the general formula—

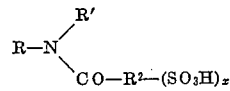

in which R represents a high molecular mono-valent hydro-carbon radical of the aliphatic or alicyclic series, R' hydrogen or a mono-valent hydro-carbon radical, $R^2$ a poly-valent hydro-carbon radical and $x$ the number of the sulfonic acid groups (1 or more).

2. An alkali salt, as defined in claim 1, wherein R represents a high molecular mono-valent aliphatic hydro-carbon radical.

3. An alkali salt, as defined in claim 1, wherein R represents a high molecular mono-valent alicyclic hydro-carbon radical.

4. An alkali salt, as defined in claim 1, wherein R' represents a mono-valent high molecular hydro-carbon radical.

5. An alkali salt, as defined in claim 1, wherein R' represents a mono-valent low molecular hydro-carbon radical.

6. An alkali salt, as defined in claim 1, wherein R' represents a mono-valent hydroxyl substituted hydro-carbon radical.

7. An alkali salt, as defined in claim 1, wherein $R_2$ represents a poly-valent high molecular hydro-carbon radical.

8. An alkali salt, as defined in claim 1, wherein $R^2$ represents a poly-valent high molecular hydro-carbon radical.

9. An alkali salt, as defined in claim 1, wherein $R^2$ represents a poly-valent hydroxyl substituted hydro-carbon radical.

10. An alkali salt as defined in claim 1, wherein at least one $SO_3H$ group is connected at the end of the $R^2$ chain as a terminal group.

11. An alkali salt as defined in claim 1, wherein R' represents a mono-valent high molecular hydro-carbon radical and wherein at least one $SO_3H$ group is connected at the end of the $R^2$ chain.

12. An alkali salt as defined in claim 1, wherein R' represents a mono-valent low molecular hydro-carbon radical and wherein at least one $SO_3H$ group is connected at the end of the $R^2$ chain.

13. The process of producing amido sulfonic acids which comprises reacting amines of the group consisting of unsubstituted or mono-substituted amines wherein at least one radical attached to the nitrogen atom is of the group consisting of the higher molecular hydro-carbon radicals of the aliphatic and alicyclic series with material of the group consisting of the halogenated carboxylic acids having one or more halogen atoms in the radical, anhydrides and chlorides of such halogenated carboxylic acids to produce halogenated acid amides, and treating the amides to substitute sulfonic acid groups for one or more of the halogen atoms to produce sulfonic acids.

14. The process of producing amido sulfonic acids which comprises reacting amines of the group consisting of unsubstituted or mono-substituted amines wherein at least one radical attached to the nitrogen is of the group consisting of the higher molecular hydro-carbon radicals of the aliphatic and alicyclic series with a halogenated carboxylic acid having one or more halogen atoms in the hydro-carbon radical at a temperature of the order of 160 to 230° C. to produce halogenated acid amide and reacting the amide with an alkali sulfite to substitute sulfonic acid radicals for one or more of the halogen atoms of the hydrocarbon radicals.

15. The process of producing amido sulfonic acids which comprises reacting amines of the group consisting of unsubstituted or mono-substituted amines wherein at least one radical attached to the nitrogen is of the group consisting of the higher molecular hydro-carbon radicals of the aliphatic and alicyclic series with a halogenated carboxylic acid having one or more halogen atoms in the hydro-carbon radical at an elevated temperature to produce halogenated acid amide and treating the amide to substitute sulfonic acid radicals for one or more of the halogen atoms of the hydro-carbon radicals.

16. The process of producing amido sulfonic acids which comprises reacting amines of the group consisting of unsubstituted or mono-substituted amines wherein at least one radical attached to the nitrogen is of the group consisting of the higher molecular hydro-carbon radicals of the aliphatic and alicyclic series with a halogenated carboxylic acid having one or more halogen atoms in the hydro-carbon radical at an elevated temperature and at sub-atmospheric pressure to produce halogenated acid amide and treating the amide to substitute sulfonic acid groups for one or more of the halogen atoms of the hydro-carbon radicals to produce sulfonic acids.

17. The process of producing amido sulfonic acids which comprises reacting amines of the group consisting of unsubstituted or mono-substituted amines wherein at least one radical attached to the nitrogen is of the group consisting of the higher molecular hydro-carbon radicals of the aliphatic and alicyclic series with anhydrides of halogenated carboxylic acid having one or more halogen atoms in the hydro-carbon radical to produce halogenated acid amide and treating the acid amides to substitute sulfonic acid radicals for one or more of the halogen atoms of the hydro-carbon radicals to produce sulfonic acids.

18. In the process of producing amido sulfonic acids the step which comprises reacting amines of the group consisting of unsubstituted or mono-substituted amines wherein at least one radical attached to the nitrogen is of the group consisting of the higher molecular hydro-carbon radicals of the aliphatic and alicyclic series with anhydrides of halogenated carboxylic acid in the presence of a neutral diluent to produce halogenated acid amides.

19. The process of producing amido sulfonic acids which comprises reacting amines of the group consisting of unsubstituted or mono-substituted amines wherein at least one radical attached to the nitrogen is of the group consisting of the higher molecular hydro-carbon radicals of the aliphatic and alicyclic series with anhydrides of halogenated carboxylic acid in the presence of a diluent of the group consisting of ether, benzol and carbon-tetra-chloride and treating the product to substitute sulfonic acid radicals for the halogen radical to produce sulfonic acid.

20. In the process of producing amido sulfonic acids the step which consists of converting halogenated carboxylic acid amides into sulfonic acids by treating the same with disulfides to produce sulfur compounds and oxidizing the sulfur compound to sulfonic acids by subjecting to the action of oxidizing agents of the group consisting of nitric acid, permanganate of potassium, hydrogen peroxide and hypochlorides.

21. In the process of producing amido sulfonic acids the step defined in claim 20 wherein the oxidation is performed in the presence of ammonium metavanadinate.

22. In the process of producing amido sulfonic acids the step which consists in converting halogenated carboxylic acid amides into sulfonic acids by reacting the same with alkali sulfites substantially at boiling temperature under pressure in an autoclave.

23. In the process of producing amido sulfonic acids the step which consists in converting halogenated carboxylic acid amides into sulfonic acids by boiling the same with alkali sulfites in a reflux condenser.

ERIK SCHIRM.